(12) United States Patent
Kim

(10) Patent No.: US 10,525,789 B2
(45) Date of Patent: Jan. 7, 2020

(54) AIR-CONDITIONING APPARATUS FOR VEHICLE BASED ON HEAT STORAGE AND COLD STORAGE

(71) Applicant: Seong Hoon Kim, Busan (KR)

(72) Inventor: Seong Hoon Kim, Busan (KR)

( * ) Notice: Subject to any disclaimer, the term of this patent is extended or adjusted under 35 U.S.C. 154(b) by 196 days.

(21) Appl. No.: 15/800,592

(22) Filed: Nov. 1, 2017

(65) Prior Publication Data

US 2019/0092123 A1    Mar. 28, 2019

(30) Foreign Application Priority Data

Sep. 26, 2017   (KR) .................. 10-2017-0124104

(51) Int. Cl.
*B60H 1/00* (2006.01)
*B60H 1/32* (2006.01)

(52) U.S. Cl.
CPC ......... *B60H 1/00492* (2013.01); *B60H 1/005* (2013.01); *B60H 1/00735* (2013.01); *B60H 1/00885* (2013.01); *B60H 1/322* (2013.01); *B60H 1/00378* (2013.01); *B60H 2001/00957* (2013.01)

(58) Field of Classification Search
USPC ..................... 454/75; 62/430–432
See application file for complete search history.

(56) References Cited

U.S. PATENT DOCUMENTS

2013/0213632 A1* 8/2013 Morita ............... B60H 1/00385
165/202
2016/0347146 A1* 12/2016 Wijaya ............... B60H 1/00335

FOREIGN PATENT DOCUMENTS

KR        20-0231247 Y1    7/2001
KR        10-1264616 B1    5/2013

* cited by examiner

*Primary Examiner* — Vivek K Shirsat
(74) *Attorney, Agent, or Firm* — Novick, Kim & Lee, PLLC; Jae Youn Kim

(57) ABSTRACT

Provided is an air-conditioning apparatus for a vehicle based on heat storage and cold storage. The apparatus includes a coolant supply unit supplying a first coolant circulating within a vehicle, a cooling unit repeatedly performing a cooling cycle using a refrigerant circulating though a first flow pipe unit, a hot/cold accumulation unit storing a second coolant of a preset capacity and communicating with the coolant supply unit through second flow pipe units, wherein the temperature of the second coolant is converted into a temperature capable of heating and accumulated in the hot/cold accumulation unit, the evaporator of the cooling unit is disposed within the hot/cold accumulation unit, and the temperature of the second coolant is converted into a temperature capable of cooling and accumulated in the hot/cold accumulation unit during the cooling cycle.

8 Claims, 3 Drawing Sheets

AIR-CONDITIONING APPARATUS FOR VEHICLE BASED ON HEAT STORAGE AND COLD STORAGE

CROSS REFERENCE TO RELATED APPLICATION

The present application claims the benefit of Korean Patent Application No. 10-2017-0124104 filed in the Korean Intellectual Property Office on Sep. 26, 2017, the entire contents of which are incorporated herein by reference.

BACKGROUND OF THE INVENTION

1. Technical Field

The present invention relates to an air-conditioning apparatus for a vehicle based on heat storage and cold storage and, more particularly, to an air-conditioning apparatus for a vehicle based on heat storage and cold storage, which heats or cools a coolant separately supplied while a vehicle is driven and supplies hot air or cold air using a temperature of the coolant separately supplied when the driving of the vehicle is completed and an engine is stopped.

2. Description of the Related Art

In general, in the case of a truck, when freight is loaded or unloaded, the engine of the truck continues to be driven in order to provide heating or cooling to a driver within the truck, thereby causing idling. Such idling has a problem in that it contaminates air along with the waster of fuel. In order to solve such problems, in a conventional technology, an additional battery is used to drive a cooler in order to prevent some parts of idling. However, there is a problem in that the battery is not used for a long time due to its capacity limit.

Furthermore, in the case of a camping car, the cooler may be driven by the battery for some time, but the battery has a limited capacity.

PRIOR ART DOCUMENT

Patent Document (Patent Document 1) (Prior Document 1) KR 10-1264616 (entitled "A cold thermal storage system")
(Patent Document 2) (Prior Document 2) KR 20-0231247 (entitled "Refrigerating system using a phase change material")

SUMMARY OF THE INVENTION

Accordingly, the present invention has been made keeping in mind the above problems occurring in the prior art, and an object of the present invention is to heat or cool a coolant within an accumulation unit while a vehicle is driving and to supply cold air or hot air to the vehicle depending on a temperature of the coolant within the hot and cold accumulation unit when the vehicle is stopped.

However, objects of the present invention are not limited to the aforementioned object, and those skilled in the art will evidently understand other objects not described above from the following description.

The object of the present invention may be achieved by an air-conditioning apparatus for a vehicle based on heat storage and cold storage, including a coolant supply unit configured to supply a first coolant circulating within a vehicle, a cooling unit configured to repeatedly perform a cooling cycle using a refrigerant circulating though a first flow pipe unit, a hot and cold accumulation unit configured to store a second coolant of a preset capacity and to communicate with the coolant supply unit through second flow pipe units, wherein the temperature of the second coolant is converted into a temperature capable of heating and accumulated in the hot and cold accumulation unit, the evaporator of the cooling unit is disposed within the hot and cold accumulation unit, and the temperature of the second coolant is converted into a temperature capable of cooling and accumulated in the hot and cold accumulation unit while the cooling cycle is performed, and a separate indoor unit to which the coolant of the hot and cold accumulation unit is transferred to through third flow pipe units and hot air or cold air is supplied.

BRIEF DESCRIPTION OF THE DRAWINGS

The following accompanying drawings attached to this specification illustrate embodiments of the present invention and function to facilitate further understanding of the technological spirit of the present invention along with the detailed description of the invention. Accordingly, the present invention should not be construed as being limited to only contents illustrated in the drawings.

DESCRIPTION OF REFERENCE NUMERALS

Figure 1:
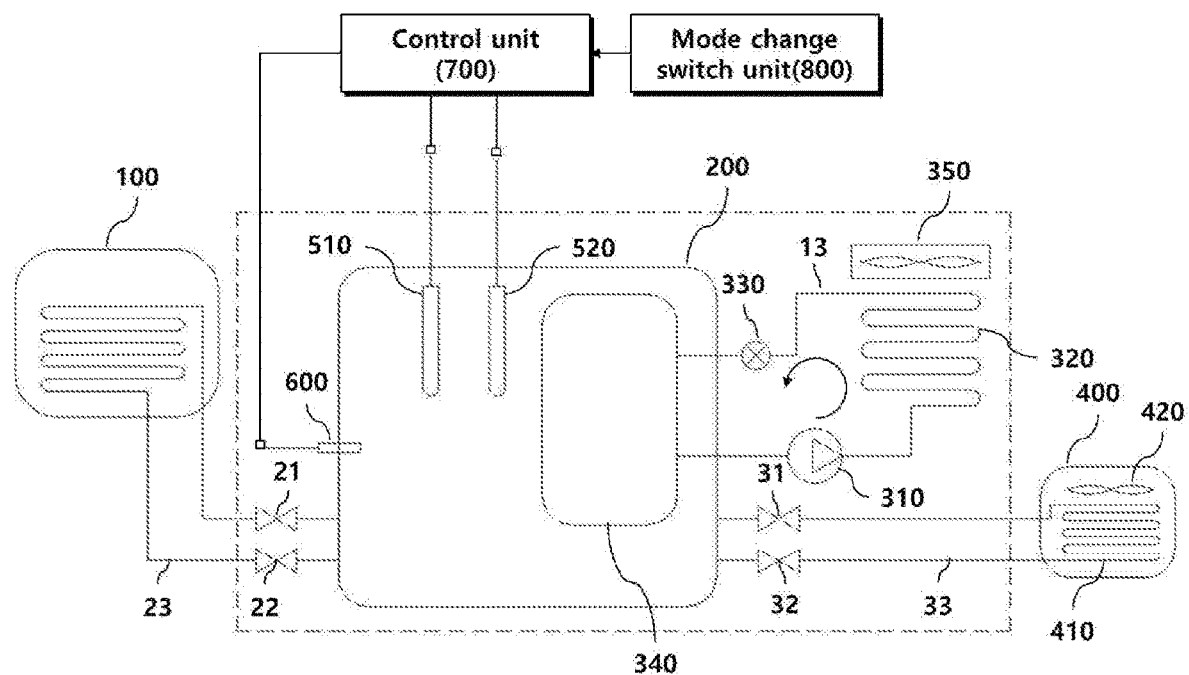
FIG. 1 is a diagram schematically showing the configuration of an air-conditioning apparatus for a vehicle based on heat storage and cold storage according to a first embodiment of the present invention.

13: first flow pipe unit (or refrigerant flow pipe)
21: first coolant valve 22: second coolant valve
23: coolant flow pipe unit (or second flow pipes)
31: first supply valve 32: second supply valve
33: third flow pipe unit
41: coolant (or antifreeze)
42: phase change material (or water)
100: coolant supply unit
200: cold and heat storage unit (or hot and cold accumulation unit)
210: isolation unit (or blocking unit or isolation unit)
300: cooling unit 310: compressor
320: condenser 330: expansion valve
340: evaporator (including refrigerant circulation pipe)
350, 420: fan
400: independent indoor unit (or separate indoor unit)
410: evaporator 510: first heater unit
520: second heater unit
600: sensor unit (pressure and temperature sensor unit)
700: control unit 800: mode change switch unit

DETAILED DESCRIPTION

Hereinafter, exemplary embodiments of the present invention are described in detail with reference to the accompanying drawings. Furthermore, it should be noted that the embodiments to be described below do not unreasonably limit the contents of the present invention written in the claims and all the elements described in the embodiments may not be considered to be essential as means for solving the present invention. Furthermore, a description of contents evident in a conventional technology and to those skilled in the art may be omitted, and reference to a description of such an omitted element (or method) and function will be sufficiently made without departing from the technological spirit of the present invention.

A air-conditioning apparatus for a vehicle based on heat storage and cold storage according to an embodiment of the present invention lowers or raises the temperature of a coolant separately supplied while a vehicle is driven (that is, while the engine is driving) and supplies hot air or cold air to the vehicle depending on a temperature of the coolant separately supplied when the driving of the vehicle is stopped (that is, when the driving of the engine is stopped). An example of the vehicle described in an embodiment of the present invention may be a truck or camping car. However, in addition to the aforementioned vehicle, the present invention may be applied to all types of vehicles on which a separate indoor unit can be mounted. Hereinafter, a truck is described as an example for a description of the present invention. The truck may be driven from a point A to a point B in order to transport freight loaded thereon. In this case, assuming that after the freight is loaded on the truck at the point A and the truck then moves by a specific distance, the freight is unloaded at the point B, in a conventional technology, cooling or heating can be supplies to the driver of the vehicle by consuming fuel (that is, by driving the engine) when the freight is loaded at the point A or unloaded at the point B. In the present invention, however, although the driving of the engine is stopped after the truck reaches the point B, cooling or heating can be supplied to the driver by lowering or raising the temperature of the coolant separately supplied while the truck is driven from the point A to the point B. The air-conditioning apparatus for a vehicle based on heat storage and cold storage according to an embodiment of the present invention is described in detail below.

<Configuration and Function of Air-Conditioning Apparatus for Vehicle Based on Heat Storage and Cold Storage>

First Embodiment

As shown in FIG. 1, a coolant supply unit 100 is provided when a vehicle is manufactured, and supplies a coolant (first coolant) for the vehicle to a hot and cold accumulation unit 200. The coolant of the vehicle rises up to approximately 80~90° C. by the driving of the engine of the vehicle. The coolant supply unit 100 and the hot and cold accumulation unit 200 are connected by second flow pipes 23, so the coolant of the vehicle is supplied to the hot and cold accumulation unit 200 and circulated. In this case, the second flow pipes 23 are equipped with first and second coolant valves 21 and 22, respectively, to control the flow of the coolant. That is, as will be described later, if the vehicle is driven in a cooling storage mode, the valves may be closed so that the hot coolant of the vehicle is not supplied from the coolant supply unit 100 to the hot and cold accumulation unit 200.

The hot and cold accumulation unit 200, a cooling unit 300 (or only the evaporator of the cooling unit), and an indoor unit 400 are separately attached to the vehicle. The hot and cold accumulation unit 200 stores a separate coolant (a second coolant or the coolant of the hot and cold accumulation unit) of approximately 20~30 liters separately from the coolant of the vehicle, and thus waste heat is accumulated in the hot and cold accumulation unit 200. In this case, the amount of the coolant may be freely increased or reduced depending on the driving time of cooling and heating after the driving of the engine is stopped. In particular, an evaporator 340 is embedded in the hot and cold accumulation unit 200 of the present invention. Since the evaporator 340 is embedded, the coolant of the hot and cold accumulation unit is cooled by the evaporator 340 while the truck is driven from a point A to a point B. The coolant of the hot and cold accumulation unit is heated by the coolant of the vehicle supplied from the coolant supply unit 100 while the truck is driven from the point A to the point B. Furthermore, the hot and cold accumulation unit 200 may be equipped with heater units 510 and 520 driven by a control unit 700, if necessary. The heater units 510 and 520 keep warm the coolant of the hot and cold accumulation unit if the temperature of the coolant of the hot and cold accumulation unit has been raised (up to approximately 80~90° C.) by the coolant of the vehicle.

A cooling device provided when a vehicle is manufactured may be used as the cooling unit 300 or the cooling unit 300 may be additionally disposed in a vehicle after the vehicle is manufactured. In either case, the hot and cold accumulation unit 200 is equipped with the evaporator 340. The cooling unit 300 includes a compressor 310, a condenser 320, an expansion valve 330, the evaporator 340 and a fan 350, and is driven in a known cooling cycle. In this case, the cooling unit 300 of the present invention is driven while the truck is driven from the point A to the point B. Accordingly, the coolant of the hot and cold accumulation unit can be cooled. The compressor 310, the condenser 320, the expansion valve 330 and the evaporator 340 are connected by a first flow pipe unit 13. In particular, the first flow pipe unit 13 is connected to the evaporator 340 disposed within the hot and cold accumulation unit 200. The cooling unit 300 may be turned on/off by the control unit 700. Alternatively, if the cooling unit 300 operates in conjunction with the engine of the truck, when the engine is turned on/off, the cooling unit 300 may also be turned on/off.

The cooling units 300 may be provided in a plural number if the capacity of the coolant of the hot and cold accumulation unit is large. That is, the cooling units 300 may further include the compressor 310, the condenser 320, the expansion valve 330, the evaporator 340 and the fan 350. In this case, the evaporator 340 is disposed within the hot and cold accumulation unit 200.

The indoor unit 400 is separately disposed in the vehicle. The indoor unit 400 is separately equipped with a control unit for driving the indoor unit. The indoor unit 400 may include an evaporator 410 and a fan 420. The indoor unit 400 and the hot and cold accumulation unit 200 are connected by third flow pipe units 33, so a coolant can circulate therein. The third flow pipe units 33 are equipped with first and second valves 31 and 32, respectively, to control the flow of the coolant. That is, as will be described later, if the truck is driven in the cooling storage mode or heating storage mode, it is preferred that the coolant of the hot and cold accumulation unit is not provided to the indoor unit 400 because the coolant is cooling or heating. When the coolant of the hot and cold accumulation unit reaches a set temperature, the indoor unit 400 may be driven in a heating mode or cooling mode.

A sensor unit 600 detects the temperature of the coolant of the hot and cold accumulation unit. The driving of the heater units 510 and 520 is controlled depending on the temperature of the coolant of the hot and cold accumulation unit. That is, when the indoor unit 400 is in the heating mode, the sensor unit 600 senses the temperature of the coolant of the hot and cold accumulation unit and controls the heater units 510 and 520 so that the temperature of the coolant of the hot and cold accumulation unit keeps warm for a long time. In this case, the control unit 700 drives the heater units when the temperature of the coolant of the hot and cold accumulation unit reaches a first set temperature, and turns off the heater units when the coolant temperature slowly rises from the first set temperature and becomes a second set temperature. In this case, the first set temperature and the second set temperature are set to have a gap temperature of a specific difference or more. Each of the set temperatures may be set so that it is subjected to hysteresis control. The sensor unit 600 may sense pressure within the hot and cold accumulation unit 200.

As described above, the control unit 700 controls the driving of the heater units 510 and 520 and receives a sensing value (or a pressure value or temperature value) from the sensor unit 600. The control unit 700 turns on/off the driving of the valves 21, 22 and 31, 32 in response to a signal supplied by a mode change switch unit 800. The mode change switch unit 800 may be disposed along with the indoor unit 400 or may be separately disposed near the driver's seat of the truck. The mode change switch unit 800 enables the hot and cold accumulation unit 200 to be driven in the cooling storage mode or the heating storage mode in response to a selection from a user. When the cooling storage mode is selected by the mode change switch unit 800, the valve driving unit of the control unit 700 turns off the valves 21 and 22 so that the coolant of the vehicle is not supplied from the coolant supply unit 100 to the hot and cold accumulation unit 200, and turns off the valves 31 and 32 so that the coolant of the hot and cold accumulation unit 200 is not supplied to the indoor unit 400. When the heating storage mode is selected by the mode change switch unit 800, the valve driving unit of the control unit turns on the valves 21 and 22 so that the coolant of the vehicle is supplied from the coolant supply unit 100 to the hot and cold accumulation unit 200, and turns off the cooling unit 300 and turns off the valves 31 and 32 so that the coolant of the hot and cold accumulation unit 200 is not supplied to the indoor unit 400.

The control unit 700 may be connected to the control unit of the indoor unit 400. That is, when the indoor unit 400 is driven in the cooling mode or heating mode, the control unit 700 may receive a corresponding driving signal and drive the heater units 510 and 520 or turn off the cooling unit 300.

(Operating Mode)

When the truck starts from the point A to the point B (i.e., an engine driving mode), a user cools or heats the coolant of the hot and cold accumulation unit by toggling the mode change switch unit 800. When the control unit 700 receives a signal according to a selection from the mode change switch unit 800, it controls the valves 21, 22 and 31, 32. When the cooling storage mode is selected, the coolant of the hot and cold accumulation unit is cooled. At this time, it is preferred that all the valves 21, 22 and 31, 32 are turned off. When the heating storage mode is selected, the coolant of the hot and cold accumulation unit is heated. At this time, the valves 21 and 22 are turned on and the valves 31 and 32 are turned off. The temperature of the coolant of the hot and cold accumulation unit reaches a required temperature until the truck reaches the point B. That is, in the case of cooling, the temperature of the coolant of the hot and cold accumulation unit drops to approximately −20° C. In the case of heating, the temperature of the coolant of the hot and cold accumulation unit reaches approximately 80~90° C., that is, the same temperature as that of the coolant of the vehicle.

If the temperature of the coolant of the hot and cold accumulation unit has been set as a required temperature until the truck reaches the point B, the control unit 700 may turn off the cooling unit 300 in the cold storage mode. However, if the cooling unit 300 is turned off, the temperature of the coolant of the hot and cold accumulation unit may slowly rise, and thus the cooling unit 300 may be driven again based on a temperature value sensed by the sensor unit 600.

When the truck arrives at the point B and thus the driving of the engine of the truck is stopped (i.e., an engine driving stop mode), the temperature of the hot and cold accumulation unit is set as a required temperature so that hot air or cold air is ready to be supplied to the indoor unit 400. When the indoor unit 400 is driven in the cooling mode, the valves 31 and 32 are open so that the coolant of the hot and cold accumulation unit is supplied to the indoor unit 400 because the temperature of the coolant of the hot and cold accumulation unit has already been set to approximately −20° C. When the indoor unit 400 is driven in the heating mode, the valves 31 and 32 are open so that the coolant of the hot and cold accumulation unit is supplied to the indoor unit 400 because the temperature of the coolant of the hot and cold accumulation unit has already been set to approximately 80~90° C. At this time, the control unit 700 senses the mode of the indoor unit 400 in order to prevent the user's error in selecting the mode. That is, when the indoor unit 400 is driven in the cooling mode, the temperature of the coolant of the hot and cold accumulation unit must be a cooling temperature. When the indoor unit 400 is driven in the heating mode, the temperature of the coolant of the hot and cold accumulation unit must be a heating temperature. In contrast, if the temperature of the coolant of the hot and cold accumulation unit is a cooling temperature, when the heating mode is selected, the control unit 700 notifies the control unit of the indoor unit 400 of such an error so that the indoor unit 400 does not malfunction. Furthermore, if the temperature of the coolant of the hot and cold accumulation unit is a heating temperature, when the cooling mode is selected, the control unit 700 notifies the control unit of the indoor unit 400 of such an error. In this case, in order to prevent such an error, it is preferred that the indoor unit 400 displays the current state of the hot and cold accumulation unit 200 and a selected operating mode is not driven if an operating mode selected in the indoor unit 400 is not matched with a temperature of the coolant of the hot and cold accumulation unit.

In the heating mode, the temperature of the coolant of the hot and cold accumulation unit slowly drops. At this time, the control unit 700 drives the heater units 510 and 520 so that the temperature of the coolant of the hot and cold accumulation unit is maintained for a long time.

The same principle as that described above is applied if the truck is driven from the point B to the point A. When the truck reaches the point A, cold air or hot air can be supplied by the indoor unit 400 using the coolant of the hot and cold accumulation unit although the driving of the engine is stopped.

Second Embodiment

In the second embodiment of the present invention, only a difference between the second embodiment and the first embodiment is described. Furthermore, the operating mode is the same as that described above, and a redundant description thereof is omitted.

Figure 2:
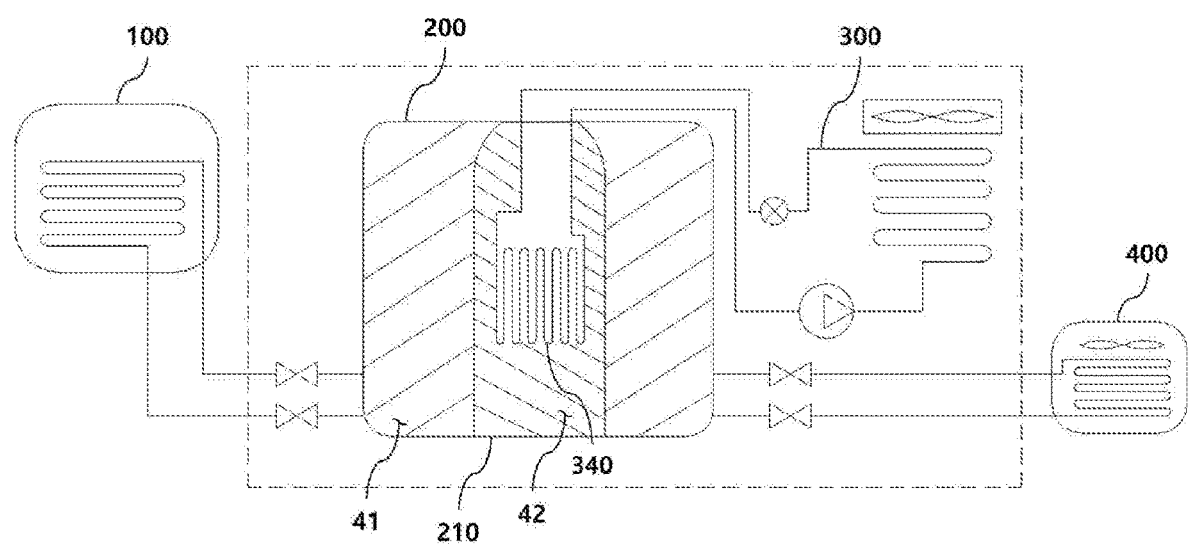
FIG. 2 is a diagram schematically showing the configuration of an air-conditioning apparatus for a vehicle based on heat storage and cold storage (an evaporator is disposed inside an isolation unit) according to a second embodiment of the present invention.

As shown in FIG. 2, the second embodiment of the present invention differs from the first embodiment in the configuration of the hot and cold accumulation unit 200. More specifically, a coolant 41 and a phase change material 42 are separated and stored in the hot and cold accumulation unit 200. The coolant may be antifreeze, and the phase change material may be water. In this case, the phase change material may be better if it has high latent heat, a small change in the volume, and high specific heat. If the coolant and the phase change material are used as in the present embodiment, the amount of cold storage is increased under the same volume (the reason for this is that the phase change material has specific heat and latent heat) compared to a case where only the coolant is used.

In order to separate and store the coolant and the phase change material, an isolation unit 210 is configured in the hot and cold accumulation unit 200. The phase change material 42 is stored in the isolation unit 210, and the evaporator 340 is disposed within the phase change material 42. The coolant 41 is stored in the hot and cold accumulation unit 200.

Third Embodiment

Only a difference between the third embodiment of the present invention and the first and the second embodiments is described. Furthermore, the operating mode is the same as that described above, and a redundant description thereof is omitted.

Figure 3:
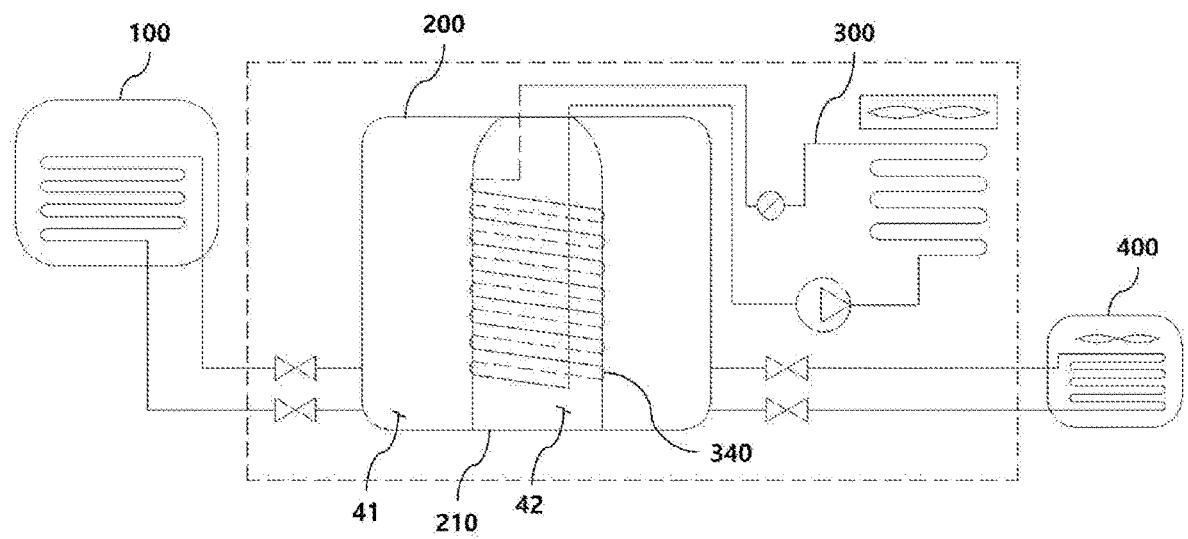
FIG. 3 is a diagram schematically showing the configuration of an air-conditioning apparatus for a vehicle based on heat storage and cold storage (the evaporator is disposed on the outer circumference of the isolation unit) according to a third embodiment of the present invention.

As shown in FIG. 3, as in the second embodiment, in the third embodiment of the present invention, the coolant 41 and the phase change material 42 are separated and stored in the hot and cold accumulation unit 200. The coolant may be antifreeze, and the phase change material may be water. In this case, the phase change material may be better if it has high latent heat, a small change in the volume, and high specific heat. If the coolant and the phase change material are used as in the present embodiment, the amount of cold storage is increased under the same volume (the reason for this is that the phase change material has specific heat and latent heat) compared to a case where only the coolant is used.

In order to separate and store the coolant and the phase change material, an isolation unit 210 is configured in the hot and cold accumulation unit 200. The phase change material 42 is stored in the isolation unit 210, and the coolant 41 is stored in the hot and cold accumulation unit 200. The evaporator 340 is wound on the outer circumference of the isolation unit 210 in the length direction. Accordingly, the evaporator 340 is disposed in the region of the coolant 41 and exposed to the coolant.

In accordance with the aforementioned embodiments of the present invention, there is an effect in that idling can be prevented because the coolant of the hot and cold accumulation unit is heated or cooled while a vehicle is driven and cold air or hot air is supplied to the vehicle depending on a temperature of the coolant of the hot and cold accumulation unit when the vehicle is stopped.

Furthermore, in accordance with the embodiments of the present invention, there is an effect in that cold air or hot air can be supplied to a vehicle although the engine of the vehicle is not driven for a long time.

In describing the embodiments of the present invention, a description of contents evident in a conventional technology and to those skilled in the art may be omitted, and reference to the description of such an omitted element (or method) and function will be sufficiently made without departing from the technological spirit of the present invention.

The configurations and functions of the aforementioned elements have been separated and described for convenience of description only, and any one configuration and function may be integrated into another element and implemented or may be subdivided and implemented.

Although the embodiments of the present invention have been described, the present invention is not limited to the embodiments and may be modified and applied in various ways. That is, those skilled in the art will easily understand that the present invention may be modified in various ways without departing from the gist of the present invention. Furthermore, it is to be noted that a detailed description of the known functions and elements related to the present invention or a coupling relation between the elements will be omitted if it is deemed to make the gist of the present invention unnecessarily vague.

What is claimed is:

1. An air-conditioning apparatus for a vehicle based on heat storage and cold storage, comprising:
    a coolant supply unit configured to supply a first coolant circulating within the vehicle;
    a cooling unit configured to repeatedly perform a cooling cycle using a refrigerant circulating through a first flow pipe unit;
    a hot and cold accumulation unit configured to store a second coolant of a preset capacity and to communicate with the coolant supply unit through second flow pipe units, wherein a temperature of the second coolant is converted into a temperature capable of heating and accumulated in the hot and cold accumulation unit, an evaporator of the cooling unit is disposed within the hot and cold accumulation unit, and a temperature of the second coolant is converted into a temperature capable of cooling and accumulated in the hot and cold accumulation unit while the cooling cycle is performed; and
    a separate indoor unit to which the second coolant of the hot and cold accumulation unit is transferred to through third flow pipe units and hot air or cold air is supplied.

2. The air-conditioning apparatus of claim 1, further comprising a control unit comprising a valve driving unit for controlling on/off of valves included in the second flow pipe units and valves included in the third flow pipe units in response to a cooling/heating storage mode of the hot and cold accumulation unit while an engine of the vehicle is driven.

3. The air-conditioning apparatus of claim 2, further comprising a mode change switch unit provided within the vehicle and configured to select any one of a cooling storage mode and heating storage mode in response to the cooling/heating storage mode.

4. The air-conditioning apparatus of claim 3, wherein:
    if the engine of the vehicle is driven and the cooling/heating storage mode is the cooling storage mode, the control unit performs control so that the valves of the second flow pipe units and the valves of the third flow pipe units are turned off and the temperature of the second coolant is accumulated as the temperature capable of cooling, and
    if the engine of the vehicle is driven and the cooling/heating storage mode is the heating storage mode, the control unit performs control so that the valves of the second flow pipe units are turned on, the valves of the third flow pipe units are turned off, and the temperature of the second coolant is accumulated as the temperature capable of heating.

5. The air-conditioning apparatus of claim 4, wherein when the engine of the vehicle is stopped and the indoor unit is turned on, the control unit performs control so that the valves of the third flow pipe units are turned on and the cold air or hot air is supplied to the vehicle by the separate indoor unit.

6. The air-conditioning apparatus of claim 5, further comprising a heater unit disposed within the hot and cold accumulation unit,
   wherein the control unit senses a temperature of the hot and cold accumulation unit and controls the heater unit based on a result of the sensed temperature so that the temperature of the second coolant maintains the temperature capable of heating.

7. The air-conditioning apparatus of claim 1, wherein: the hot and cold accumulation unit is divided into a section in which the second coolant is stored and a section in which a phase change material is stored, and
   the evaporator is disposed within the phase change material.

8. The air-conditioning apparatus of claim 1, wherein: the hot and cold accumulation unit is divided into the second section in which the second coolant is stored and a section in which a phase change material is stored, and
   the evaporator is disposed to be exposed to the second coolant.

* * * * *